United States Patent [19]

Hinkley

[11] Patent Number: 5,119,849
[45] Date of Patent: Jun. 9, 1992

[54] GUTTER BACKFLUSH APPARATUS

[76] Inventor: Robert A. Hinkley, 4904 Maunalani Cir., Honolulu, Hi. 96816

[21] Appl. No.: 724,293

[22] Filed: Jul. 1, 1991

[51] Int. Cl.$^5$ .............................................. B08B 3/02
[52] U.S. Cl. ............................. 134/104.1; 134/166 C; 134/198; 134/201; 134/186; 52/11
[58] Field of Search ........... 134/104.1, 166 C, 166 R, 134/198, 201, 186; 52/11

[56] References Cited

U.S. PATENT DOCUMENTS

| | | |
|---|---|---|
| 2,523,435 | 9/1950 | Jones. |
| 2,710,616 | 6/1955 | Tydings ........................ 134/167 R |
| 2,887,073 | 5/1959 | Thompson. |
| 3,041,655 | 7/1962 | Entler ............................ 134/167 R |
| 4,183,368 | 1/1980 | Husted. |
| 4,349,039 | 9/1982 | Egger ............................ 134/167 C |
| 4,602,460 | 7/1986 | Langenbach. |
| 4,634,312 | 1/1987 | Sterzel .......................... 134/166 C |
| 4,972,863 | 11/1990 | Morrow ......................... 134/167 R |

Primary Examiner—Frankie L. Stinson
Attorney, Agent, or Firm—Henderson & Sturm

[57] ABSTRACT

An apparatus (10) for flushing a gutter (300) and downspout (100) clean of debris; wherein, the downspout (100) is provided with a flushing agent supply unit (11) which can operatively engage a conventional garden hose; a downspout valve unit (12) which can block the downward end of the downspout (100); and a drain diverting unit (13) which can divert the flow of material in the downspout through an auxiliary aperture (27); wherein, the operation of the apparatus (10) calls for filling the entire system with water so that the debris may be washed over the edge of the gutter (300).

7 Claims, 1 Drawing Sheet

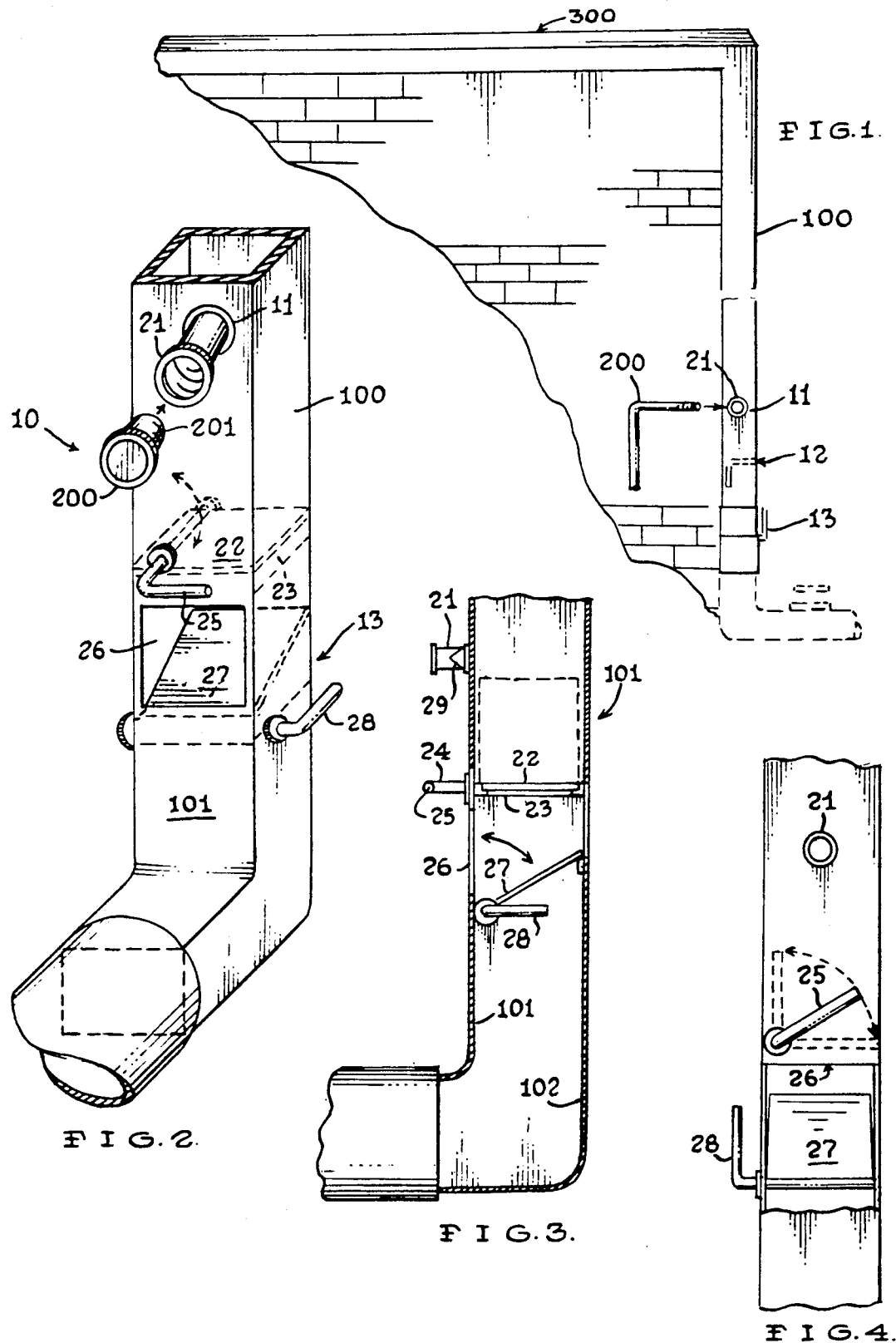

GUTTER BACKFLUSH APPARATUS

TECHNICAL FIELD

The present invention relates to gutter cleaning devices in general, and in particular to a gutter backflushing device that utilizes an accumulation of water supplied by a conventional garden hose as its flushing element.

BACKGROUND ART

This invention was the subject matter of Document Disclosure Program Registration No. 258242 which was filed in the United States Patent and Trademark Office on Jul. 24, 1990.

As can be seen by reference to the following U.S. Pat. Nos. 2,523,435; 2,887,073; 4,183,368 and 4,602,460; the prior art is replete with myriad and diverse gutter and downspout cleaning devices.

While all of the aforementioned prior art constructions are more than adequate for the basic purpose and function for which they have been specifically designed, these prior art constructions are uniformly deficient in that they require that all the debris in the gutter system be flushed through the downspout. Furthermore in instances where large items are in the gutter such as toys or pine cones, this is an impractical approach. In addition, these prior art constructions do not allow for a quiescent period; where the gutter can be filled for a finite time with the flushing agent so as to facilitate the fluid suspension of mud or other debris that may otherwise adhere to the gutter during the flushing process.

As a consequence of the foregoing situation, there has existed a longstanding need for a new type of gutter flushing apparatus that provides for both the flushing of debris over the edge of the gutter and/or through the downspout. In addition, this apparatus should allow for a selected period of time in which the gutter remains filled with the flushing agent so as to facilitate the dissolving of debris; and, the provision of such a construction is a stated objective of the present invention.

DISCLOSURE OF THE INVENTION

Briefly stated, this invention comprises a gutter flushing apparatus that utilizes a conventional garden hose, that is releasably attached to the apparatus, to supply a flushing agent to a downspout. In addition, the downspout itself is provided with a valve which is used to operatively block the downward end of the downspout so that the gutter may be filled with the flushing agent; and, a flap which serves a dual purpose of selectively diverting the flushing agent to the exterior of the downspout or maintaining the flow within the confines of the downspout.

As will be explained in greater detail further on in the specification, the apparatus may be used to flush a gutter system such that the debris will either; run over the edge of the gutter and, through or out of the downspout. In addition, the apparatus can be used to fill the gutter with the flushing agent for an extended period of time before the flushing takes place; and, then the subsequent flow of the flushing agent can be either confined within the normal flow path within the downspout or diverted out the side of the downspout.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a depiction of the apparatus of this invention installed in a typical gutter and downspout environment;

FIG. 2 is an isolated perspective view of the apparatus installed in the lower portion of the downspout;

FIG. 3 is a cross-sectional side view of the apparatus installed in the downspout; and, FIG. 4 is a front plan view of the apparatus with the drain diverting unit disposed in the open mode of disposition;

BEST MODE FOR CARRYING OUT THE INVENTION

As can be seen by reference to the drawings, and in particular to FIG. 1, the gutter flushing apparatus that forms the basis of the present invention is designated generally by the reference numeral (10).

The apparatus (10) comprises in general; a flushing agent supply unit (11); a downspout valve unit (12); and, a drain diverting unit (13). These units will now be described in seriatim fashion.

As can best be seen by reference to FIGS. 2, and 3 the flushing agent supply unit (11) comprises a generally cylindrical hose coupling member (21); that, in the preferred embodiment of the invention includes a conventional one-way valve element (29) so as to allow flow in only one direction through the coupling member (21) and into the downspout (100) as indicated by the arrow in FIG. 1.

Again referring to FIGS. 2 and 3 it can be seen that the downspout valve unit (12) comprises in general; a valve member (22) and a valve seat member (23); located downstream from the valve member (22) plus means (24) for operatively moving the valve member (22) into and out of engagement with the valve seat member (23); which in the preferred embodiment comprises a handle member (25). The valve member (22) and the valve seat member (23) are dimensioned to form a liquid-tight seal within the downspout (100) when the valve member (22) operatively engages the valve seat member (23).

In the preferred embodiment shown in FIGS. 1 through 4, the apparatus (10) further comprises a drain diverting unit (13) which comprises; an aperture (26) located on one (101) of the walls of the downspout (100); a diverter flap member (27) operatively connected to the downspout (100) and dimensioned to operatively cover the aperture (26) in one mode of operation wherein the diverter flap member (27) is also dimensioned to operatively engage the opposing wall (102) of the downspout (100) in another mode of operation; and a means (28) for operatively moving the flap member (27) from one mode of operation to the other.

The operation of the preferred embodiment of the apparatus (10) is as follows; a conventional garden hose (200) is operatively connected on one end (201) to the flushing agent supply unit (11) or 21; and the valve member (22) is operatively engaged with the valve seat member (23), thereby forming a liquid-tight seal. At this juncture, the water supply is turned on, and water fill first the downspout (100) and then the gutter (300). In one mode of operation the water and the loose debris in the gutter (300) eventually overflow the edges of the gutter (300), and this process is continued until the gutter is free of large and buoyant articles of debris.

The water supply is then shut off and the accumulated water or flushing agent is left alone for a selected period of time. During this period debris that may have adhered to the inner surfaces of the gutter (300) are ideally dissolved or suspended in the water or other flushing agent that remains in the gutter (300).

At the end of this period, the diverter flap member (27) of the drain diverting unit (12) is optionally moved so as to open the aperture (26) and engage the opposing wall (102) of the downspout (100); and the valve member (22) is then disengaged from the valve seat member (23) and the captive mixture of water and newly-dissolved debris that is in the gutter (300) and downspout (100) passes through the aperture (26); wherein, the user may place a container (not shown) to catch the diverted mixture, or merely rake-up debris along with gutter over-spill debris.

It should be noted that the flushing agent, need not be water, but any desired liquid cleaning agent whose supply has sufficient pressure to overcome the head pressure presented by the gutter (300) and the downspout (100).

It should also be appreciated that in some instances the user may decide to maintain the fluid integrity of the downspout (100); wherein, the diverter flap member (27) is kept in a closed position relative to the downspout aperture (26) such that the accumulated water and suspended debris will flow freely through the downspout (100) and onto the ground surface as is the case with most roof gutter/downspout systems. However, if a system incorporates a below-ground drain pipe into which the downspout empties, it would be to the advantage of the owner, upon periodic backflush cleaning, to open the diverter valve to allow the debris to be ejected from the downspout onto ground level rather than clog the below-ground drain system which is difficult and expensive to purge.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A gutter flushing apparatus for cleaning a rain gutter and downspout of accumulated debris; wherein the apparatus comprises:
    a flushing agent supply unit including a fluid coupling member operatively engaged with said downspout; and dimensioned to be connected to a fluid supply hose for supplying pressurized to be connected to a fluid supply hose for supplying pressurized fluid to said downspout; and,
    a downspout valve unit disposed in said downspout below the flushing agent supply unit and including: a valve seat disposed within said downspout and a valve member operatively connected to said downspout and dimensioned to form a liquid-tight seal within the interior of the downspout when the valve member engages the valve seat;
    means for operatively moving the valve member into and out of engagement with said valve seat; and
    control means for introducing fluid into said downspout when the valve member is engaged with the valve seat for forcing the fluid and accumulated debris upwardly within the downspout and into the gutter such that the fluid will cause the loosened accumulated debris to be flushed over at least one of the sides of the gutter.

2. The apparatus, as in claim 1, wherein the fluid coupling member includes a conventional one-way valve element.

3. The apparatus, as in claim 1, wherein the apparatus further comprises:
    an aperture provided on one of the walls of the downspout; and,
    a drain diverting unit including; a flap member disposed within the interior of the downspout and dimensioned to operatively cover said aperture in one mode of operation; and to operatively engage at least the opposing interior wall of the downspout in another mode of operation; and,
    means for operatively moving the flap member from one mode of operation to the other mode of operation; wherein, in said one mode of operation the fluid in the downspout and gutter will flow entirely through the downspout; and, in the other mode of operation the fluid will flow out the aperture in the downspout.

4. The apparatus, as in claim 3, wherein the valve member and flap member are formed of a sturdy, non-porous material.

5. The apparatus, as in claim 3, wherein the means for operatively moving the flap member for one mode of operation to the other mode of operation comprises; a handle member.

6. The apparatus, as in claim 1, wherein the fluid coupling member is dimensioned to operatively engage a conventional garden hose.

7. The apparatus, as in claim 1, wherein the means for operatively moving the valve member into and out of engagement with the valve seat comprises; a handle member.

* * * * *